(12) United States Patent
Uemura

(10) Patent No.: US 9,076,089 B2
(45) Date of Patent: Jul. 7, 2015

(54) IMAGE PROCESSING APPARATUS AND METHOD FOR PRINTING ACCORDING TO A DOT-ARRANGEMENT MATRIX

(71) Applicant: CANON KABUSHIKI KAISHA, Tokyo (JP)

(72) Inventor: Hiroshi Uemura, Zushi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/013,514

(22) Filed: Aug. 29, 2013

(65) Prior Publication Data

US 2014/0071466 A1    Mar. 13, 2014

(30) Foreign Application Priority Data

Sep. 7, 2012   (JP) .................................. 2012-197369

(51) Int. Cl.
   *H04N 1/60*      (2006.01)
   *G06K 15/02*     (2006.01)
   *H04N 1/405*     (2006.01)
   *H04N 1/52*      (2006.01)

(52) U.S. Cl.
   CPC ................ *G06K 15/02* (2013.01); *H04N 1/405* (2013.01); *H04N 1/52* (2013.01)

(58) Field of Classification Search
   None
   See application file for complete search history.

(56) References Cited

U.S. PATENT DOCUMENTS

| 6,991,316 | B2 * | 1/2006 | Maru et al. ...................... 347/41 |
| 7,477,422 | B2 * | 1/2009 | Konno et al. ................. 358/3.06 |
| 7,641,309 | B2 * | 1/2010 | Teshigawara et al. .......... 347/43 |
| 7,957,031 | B2 * | 6/2011 | Kakutani ..................... 358/3.01 |
| 8,001,720 | B2 * | 8/2011 | Noguchi et al. .................. 47/15 |
| 8,023,151 | B2 * | 9/2011 | Kakutani ..................... 358/3.01 |
| 8,023,154 | B2 * | 9/2011 | Kakutani ..................... 358/3.14 |
| 8,186,793 | B2 * | 5/2012 | Hosaka et al. .................. 347/14 |
| 8,201,911 | B2 * | 6/2012 | Tatsumi .......................... 347/15 |
| 2004/0041868 | A1 * | 3/2004 | Maru et al. ..................... 347/15 |
| 2008/0043257 | A1 * | 2/2008 | Yamazaki et al. ............. 358/1.8 |

FOREIGN PATENT DOCUMENTS

| JP | 2004-90462 A | 3/2004 |
| JP | 2009-39944 A | 2/2009 |

\* cited by examiner

*Primary Examiner* — Dung Tran
(74) *Attorney, Agent, or Firm* — Fitzpatrick, Cella, Harper & Scinto

(57) ABSTRACT

Provided are an image processing apparatus and an image processing method that are able to optimize the arrangement method and arrangement size of a plurality of dot-arrangement patterns for each printing mode and each nozzle array without creating a need to increase memory. In order for this, a dot-arrangement table that stores a plurality of patterns having different dot arrangements for each level of multi-value data, and a small matrix arrangement table that stores information about the arrangement of those patterns are prepared. Desired arrangement information is acquired from the small matrix arrangement table according to the size and reading starting address of arrangement information that was set for each printing mode, and a unique dot-arrangement matrix is generated for each printing mode.

25 Claims, 13 Drawing Sheets

| 0x0000 | Dot_Table_0 |
|--------|-------------|
| 0x0008 | Dot_Table_1 |
| 0x0010 | Dot_Table_2 |
| 0x0018 | Dot_Table_3 |
| . | . |
| . | . |
| . | Dot_Table_n |

FIG.6

| 0x1000 | SMALL MATRIX_0 |
| --- | --- |
| 0x1004 | SMALL MATRIX_1 |
| 0x1008 | SMALL MATRIX_2 |
| 0x100C | SMALL MATRIX_3 |
| 0x1010 | SMALL MATRIX_4 |
| 0x1014 | SMALL MATRIX_5 |
| 0x1018 | SMALL MATRIX_6 |
| 0x101C | SMALL MATRIX_7 |
| 0x1020 | SMALL MATRIX_8 |
| 0x1022 | SMALL MATRIX_9 |
| • | • |
| • | • |
| • | SMALL MATRIX_m |

FIG.8

IMAGE PROCESSING APPARATUS AND METHOD FOR PRINTING ACCORDING TO A DOT-ARRANGEMENT MATRIX

BACKGROUND OF THE INVENTION

1. Field of the Invention

The present invention relates to an image processing apparatus for printing an image by converting multi-value image data to binary data, and combining the printing or non-printing of dots. Particularly, the invention relates to image processing that correlates and prepares a dot-arrangement pattern, which indicates the printing/non-printing of dots, with multi-value image data, and effectively lessens image defects that are caused by the arrangement period of the dot-arrangement pattern.

2. Description of the Related Art

Many inkjet printers convert low-resolution multi-value image data (600 dpi, 256 values) to high-resolution binary data (1200, dpi, 2 values), and print an image by printing (1) or not printing (0) dots. When doing this, often the main image processing is performed using the original resolution and gradation of the image data, and then after quantizing the image data to that having lower gradation, a dot-arrangement pattern for which the printing/non-printing of dots is set in advance is often used to convert the image data to binary data that corresponds to the printing resolution. Preferably, a plurality of patterns in which the positions where the dots are arranged differ from each other even though the gradation is the same are prepared, and also, in order to make uniform the frequency of use of printing elements, preferably these plural patterns are used without bias.

For example, Japanese Patent Laid-Open No. 2004-090462 discloses a method where, in order to prevent stripes or the like that occur due to the periodic arrangement of the dot-arrangement pattern, prepares an A×B matrix in which the plural patterns above that correspond to the same gradation are arranged in the raster direction and column direction.

Moreover, Japanese Patent Laid-Open No. 2009-039944 discloses construction that prepares plural matrices in which the plural patterns above are arranged, and correlates those matrices with the conveyance amount that changes according to the printing mode.

In this way, by devising the arrangement method and arrangement size of the plural dot patterns, lessening image defects that are caused by the periodic arrangement of the dot-arrangement pattern can be expected.

Incidentally, it is preferred that the arrangement method and arrangement size of the plural dot patterns described above be such that, in order to obtain the optimum effect, the printing mode is different and optimized for each ink color, or in other words, for each nozzle array that discharges ink.

However, in recent years, as ink that is used has become multi-colored, and there is a diversification of dot sizes, there has been a tendency to increase the number of nozzle arrays that discharge ink. At the same time, in order to improve both image quality and printing speed, many printing modes having different numbers of nozzle arrays, printing resolutions, conveyance speeds and the like used in printing have been prepared for a single printer. In such a situation, when trying to prepare a fixed matrix that corresponds to each of the nozzle arrays in each printing mode as disclosed in Japanese Patent Laid-Open No. 2004-090462 and Japanese Patent Laid-Open No. 2009-039944, the increase in the needed memory capacity is a concern, and maintaining that memory capacity becomes a large problem.

SUMMARY OF THE INVENTION

The present invention was invented in order to solve the problems described above. Therefore, the objective of the present invention is to provide an image processing apparatus and an image processing method that optimizes the arrangement method and arrangement size of the plural dot-arrangement patterns for each printing mode and each nozzle array without creating a need to increase memory.

In a first aspect of the present invention, there is provided an image processing apparatus comprising: a storing unit configured to store a plurality of small matrices each of which correlates each pixel included in a predetermined area of the printing medium with a dot-arrangement pattern specifying dot arrangement to be printed in an area corresponding to a pixel according to a gradation level of the pixel, wherein a plurality of the dot-arrangement patterns are prepared for each of the gradation level and correlation relationships between each pixel and the dot-arrangement pattern are different among the plurality of the small matrices; a generation unit configured to determine a size for arranging the small matrix and a combination of the small matrices among the plurality of the small matrices for arranging in the size and generate a dot-arrangement matrix of the size by arranging the determined small matrices; and a setting unit configured to set dot arrangement to be printed in an area of the printing medium corresponding to the size according to the dot-arrangement matrix generated by the generation unit.

In a second aspect of the present invention, there is provided an image processing method comprising: a storing step for storing a plurality of small matrices each of which correlates each pixel included in a predetermined area of the printing medium with a dot-arrangement pattern specifying dot arrangement to be printed in an area corresponding to a pixel according to a gradation level of the pixel, wherein a plurality of the dot-arrangement patterns are prepared for each of the gradation level and correlation relationships between each pixel and the dot-arrangement pattern are different among the plurality of the small matrices; a generation step for determining a size for arranging the small matrix and a combination of the small matrices among the plurality of the small matrices for arranging in the size, and generating a dot-arrangement matrix of the size by arranging the determined small matrices; and a setting step for setting dot arrangement to be printed in an area of the printing medium corresponding to the size according to the dot-arrangement matrix generated by the generation step.

Further features of the present invention will become apparent from the following description of exemplary embodiments (with reference to the attached drawings).

BRIEF DESCRIPTION OF THE DRAWINGS

FIGS. 5A and 5B are drawings illustrating examples of a dot-arrangement table;

FIG. 6 is a drawing illustrating the stored state of plural dot-arrangement tables;

FIG. 8 is a drawing illustrating the stored state of matrix tables inside a dot-arrangement pattern memory;

DESCRIPTION OF THE EMBODIMENTS

Figure 1:
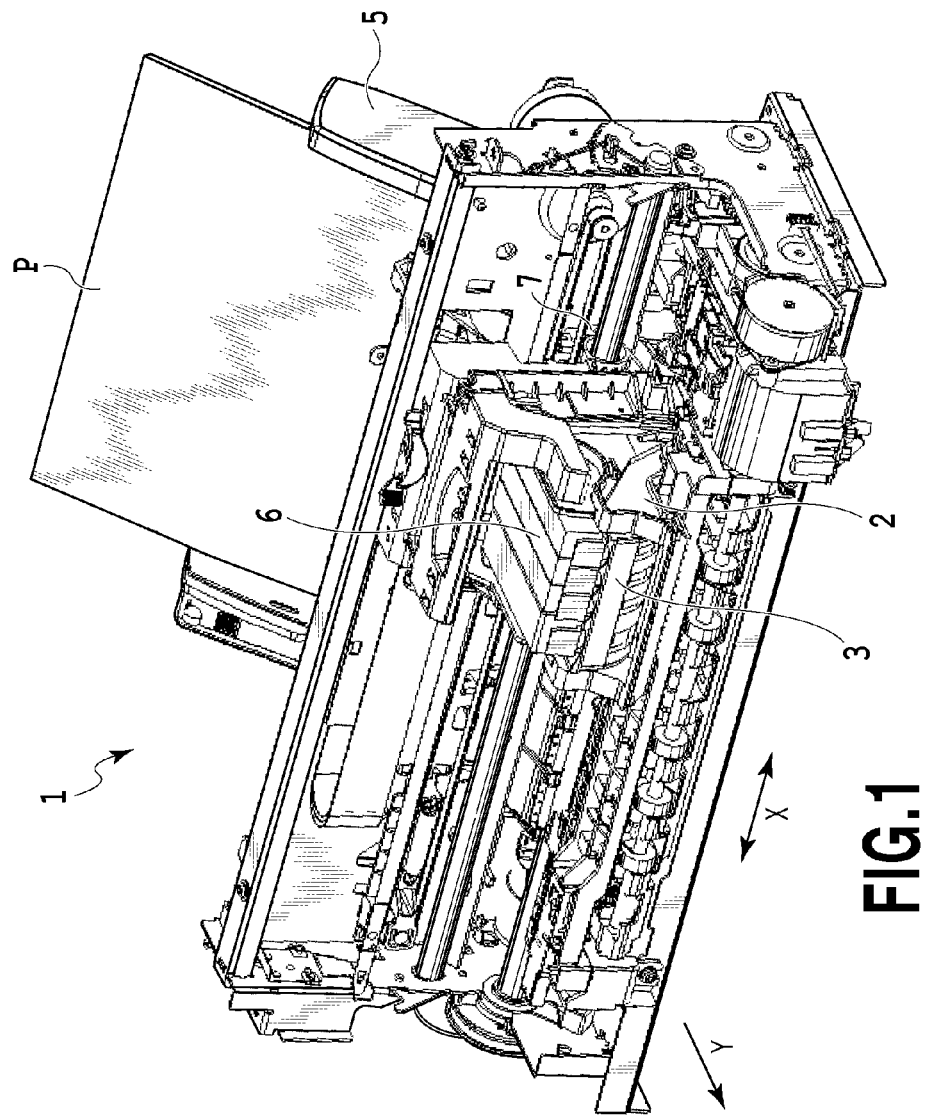
FIG. 1 is a perspective view illustrating the external construction of an inkjet printer that can be used in the present invention.

FIG. 1 is a perspective drawing illustrating the external construction of an inkjet printer (hereafter, referred to as a printer) that can be used in the present invention.

An inkjet printing head (hereafter, called a printing head) 3 that can discharge ink by the inkjet method is mounted on a carriage 2, and that carriage 2 is moved back-and-forth in the direction of arrow X (main scanning direction).

Figure 2:
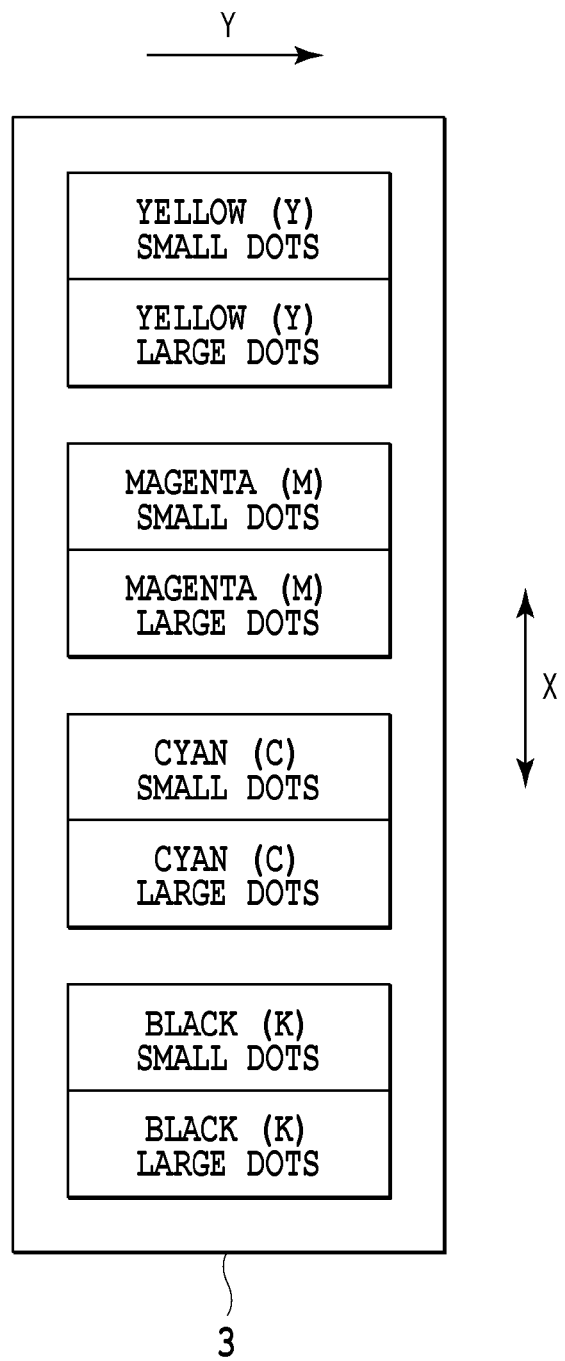
FIG. 2 is a drawing illustrating the array configuration of nozzles in a printing head.

FIG. 2 is a drawing illustrating the arrangement structure of nozzles in the printing head 3. The printer 1 of this embodiment is a color printer, and the printing head 3 has large-dot nozzle arrays that discharge comparatively large ink drops, and small-dot nozzle arrays that discharge comparatively small ink drops for the colors magenta (M), cyan (C), yellow (Y) and black (K). These eight nozzle arrays are arranged in parallel in the main scanning direction (X direction). In each nozzle array, a plurality of nozzles that discharge ink drops having the same color and the same amount are arranged in the sub scanning direction (Y direction) with uniform spacing corresponding to the printing resolution.

Returning to FIG. 1, in addition to the printing head 3, four ink cartridges 6 for supplying ink to each of the nozzle arrays of the printing head 3 are mounted on the carriage 2. Each of the four ink cartridges 6 can be independently attached to or removed from the carriage 2, and one ink cartridge is constructed so as to be able to supply ink in common to both large-dot nozzle arrays and small-dot nozzle arrays that discharge ink of the same color.

Printing medium P such as printing paper is supplied to inside the printer by a paper-feeding mechanism 5, and is conveyed to a position where printing by the printing head 3 is possible. One band of an image is printed on the printing medium P by the printing head 3 discharging ink according to printing data while carriage 2 is moving. An image is formed on the printing medium P by alternately repeating this kind of one-band printing moving, and a conveyance operation of conveying the printing medium P in the direction of the Y arrow (sub scanning direction) an amount corresponding to the printing width of one band.

Figure 3:
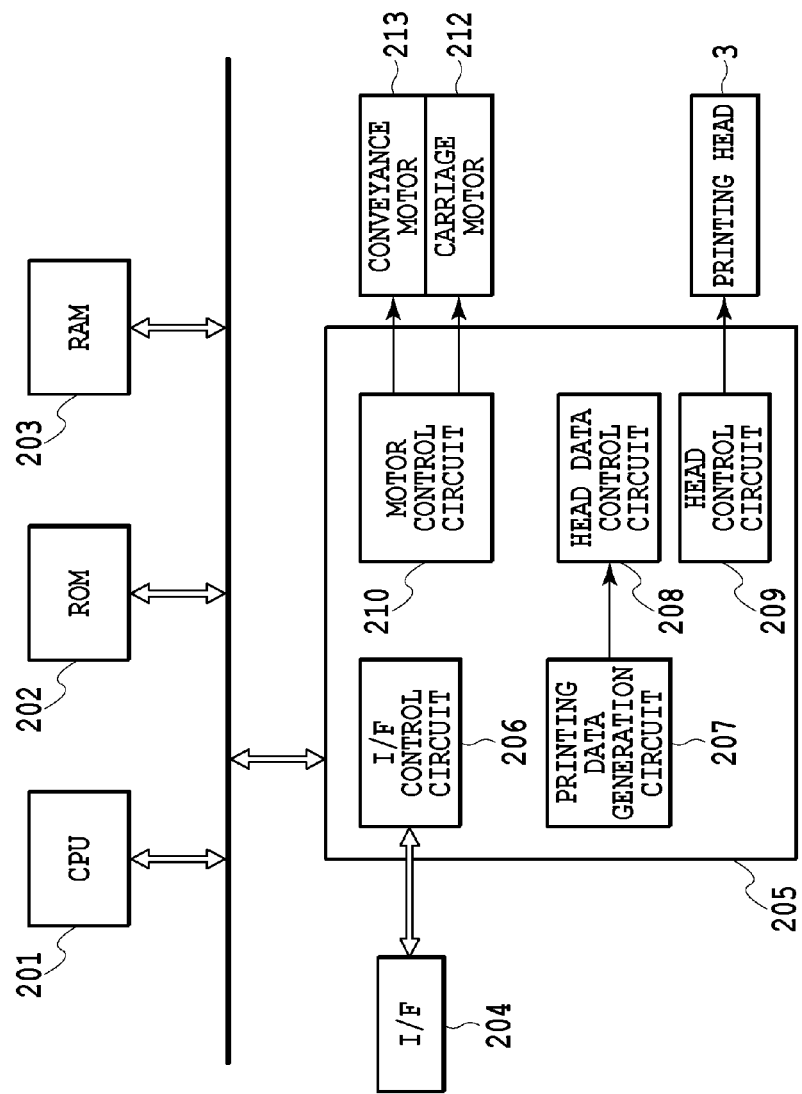
FIG. 3 is a block diagram illustrating the control structure of a printer.

FIG. 3 is a block diagram illustrating the control structure of the printer 1. A CPU 201 performs overall control of the printer 1 according to a program that is stored in ROM 202, while using RAM 203 as a work area. A receiving buffer for storing received data, a printing buffer that temporarily stores image data during processing, and a mask buffer that stores mask data that is used while performing multi-pass printing are maintained in the RAM 203. Image data that is inputted by way of an interface I/F 204 is converted to printing data that can be printed by the printing head 3 by an ASIC format printer controller 205.

The AISC 205 includes an interface control circuit 206, a printing data generation circuit 207, a head data control circuit 208, a head control circuit 209 and a motor control circuit 210. The interface control circuit 206 transmits data to and receives data from a host device by way of the interface 204. The printing data generation circuit 207 converts received image data to printing data that can be printed by the printing head 3. The head data control circuit 208 temporarily stores the printing data, and rearranges the data in order to be transferred to the printing head 3. The head control circuit 209 performs control for transferring data to the printing head 3, and performs control for discharging ink. The motor control circuit 210 performs driving control of a carriage motor 212 that causes moving of the carriage 2, and a conveying motor 213 that conveys and discharges the printing medium.

Figure 4:
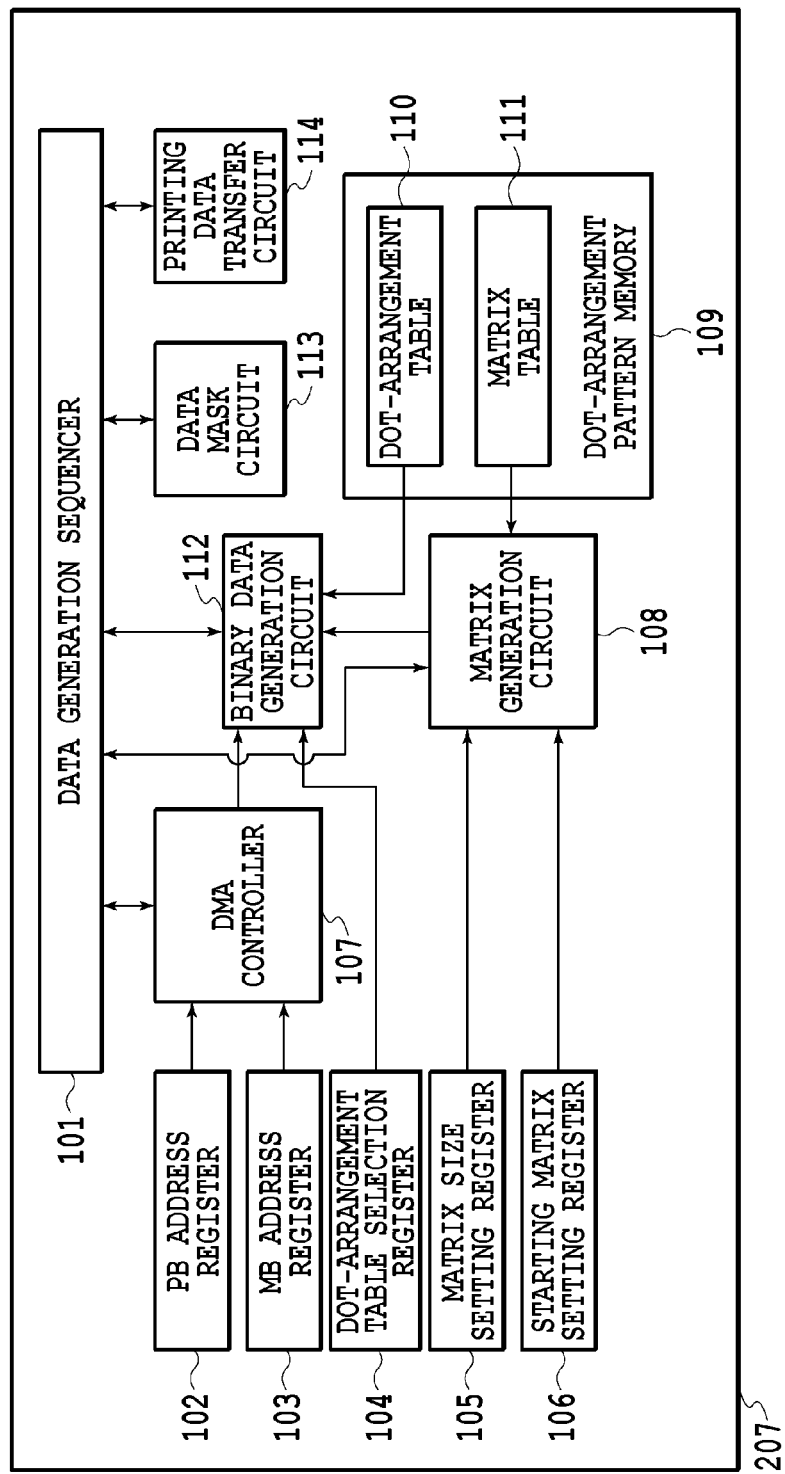
FIG. 4 is block diagram illustrating the construction of a printing data generation circuit.

FIG. 4 is a block diagram illustrating the construction of the printing data generation circuit 207. A data generation sequencer 101 manages the series of sequences from a process of reading printing data from RAM 203, to a process of transferring printing data to the head data control circuit 208.

A DMA controller 107 accesses a PB address register 102 and MB address register 103 according to a trigger from the data generation sequencer 101, and then according to a set address, reads data from the print buffer and mask buffer. Image data that is read from the print buffer is converted by specified image processing to multi-value data, and then inputted to a binary data generation circuit. The PB address register 102 and MB address register 103 can set an address for each nozzle array.

On the other hand, a matrix generation circuit 108 generates a dot-arrangement matrix according to a matrix size that is set on a matrix size setting register 105 and a reading starting address that is set on a starting matrix setting register 106.

A binary data generation circuit 112 reads one of a plurality of dot arrangement tables 110 that are stored in a dot-arrangement pattern memory 109 according to a selection by a dot-arrangement table selection register 104. The binary data generation circuit 112 then expands the multi-value data for each individual pixel to binary data according to the dot-arrangement table 110 that was read and a dot-arrangement matrix that was generated by the matrix generation circuit 108. The dot-arrangement table selection register 104 can set a dot-arrangement table 110 for each nozzle array.

The binary data that is generated by the binary data generation circuit 112 is transmitted to the data mask circuit 113 where mask processing is executed according to mask data that is read from a mask buffer. Mask processing is processing for finally setting pixels for which actual discharge of ink will be allowed in each printing scan of the carriage 2 when the printer 1 performs multi-pass printing, and may be omitted when multi-pass printing is not performed. After binary data for which ink is to be discharged is finally set for each printing scan in this way, that binary data is then outputted to the head data control circuit 208 by way of a printing data transfer circuit 114.

Figures 5A, 5B:
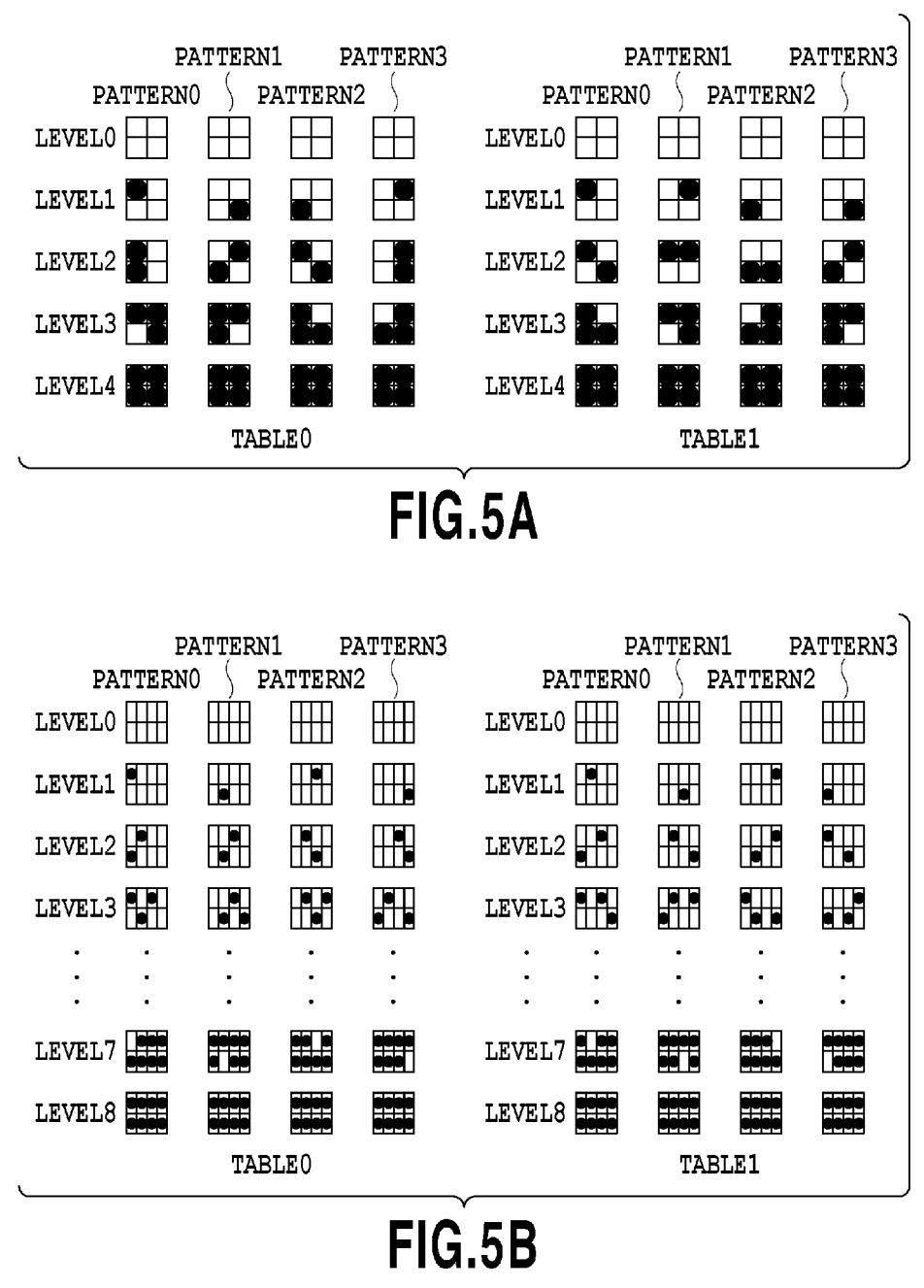

FIGS. 5A and 5B are drawings illustrating examples of dot-arrangement tables that are stored in advance in the dot-arrangement pattern memory 109. FIG. 5A illustrates an example of a dot-arrangement table for the case in which 600 ppi, 2-bit 5-value data is converted to 1200×1200 dpi, 1-bit binary data. When converting from 600 ppi 5-value data to 1200×1200 dpi binary data, one 600 ppi pixel area corresponds to a 2×2 pixel area of 1200×1200 dpi, and data of levels 0 to 4 is converted to 2×2 binary data that indicates whether each pixel will be printing (1) or not printing (0).

When 5-value data is level 0, there are no pixels for which dots are printed in a 2×2 pixel area. In the case of level 1, one pixel is printing (1) and the remaining 3 pixels are not printing (0) in a 2×2 pixel area. In the case of level 2, two pixels are printing (1) and the remaining 2 pixels are not printing (0) in a 2×2 pixel area. As the level increases by one in this way, the number of printed pixels increases by one, and the number of non-printed pixels decreases by one in a 2×2 pixel area.

In this case, there is only one dot arrangement method for level 0 and level 4; however, for levels 1 to 3 plural arrangement methods are possible. In this embodiment, plural patterns having different arrangements of printed pixels are prepared in this way for the same level, and are classified and managed as pattern 0 to pattern 3. In a state in which four patterns 0 to 3 are correlated for each level 0 to 4, the patterns are stored in the dot-arrangement pattern memory 109 as one set of dot-arrangement tables.

On the other hand, FIG. 5B illustrates an example of a dot-arrangement table that is used when converting 600 ppi, 3-bit 9-value data to 2400×1200 dpi, 1-bit binary data. When converting 600 ppi 9-value data to 2400×1200 dpi binary data, one 600 ppi pixel area corresponds to a 4×2 pixel area of 2400×200 dpi, and data of levels 0 to 8 is converted to 4×2 binary data that indicates whether each pixel is printing (1) or not printing (0).

In this case as well, it is possible to prepare plural patterns having different arrangements of printing pixels for the same level, and in this embodiment, the patterns are managed as patterns 0 to 3. In a state in which four patterns 0 to 3 are correlated for each level 0 to 8, the patterns are stored in the dot-arrangement pattern memory 109 as one set of dot-arrangement tables.

For the dot-arrangement table such as described above, it is possible to prepare a plurality of kinds of tables such as table 0 and table 1 that have different combinations of patterns 0 to 3. In this embodiment, n+1 number of tables (table 0 to table n) are prepared for each resolution.

FIG. 6 is a drawing illustrating the stored state in the dot-arrangement pattern memory 109 of this kind of plurality of dot-arrangement tables. Binary data that indicates each individual dot-pattern is correlated with pattern number and the level value and stored in order, and is stored in a specified address for each table number.

Figure 7:
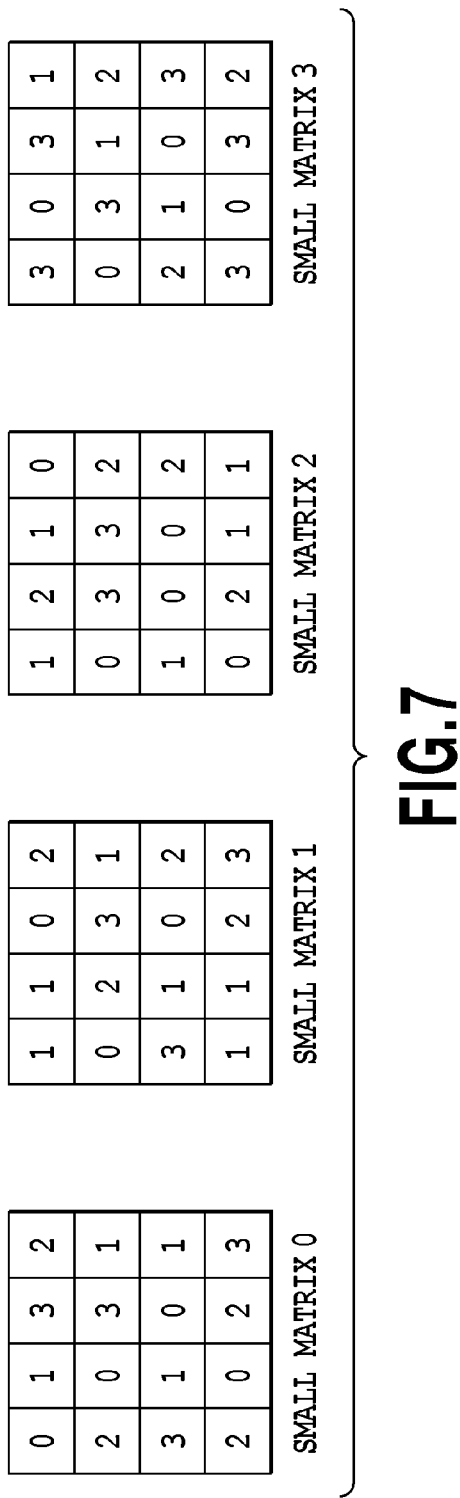
FIG. 7 is a drawing illustrating an example of matrix tables that are stored in a dot-arrangement pattern memory.

FIG. 7 is a drawing illustrating an example of a matrix table that is stored in the dot-arrangement pattern memory 109. In a matrix that has 4×4 pixels as one unit, the number 0 to 3 that is given to each individual pixel is information that corresponds to the patterns 0 to 3 that are illustrated in FIGS. 5A and 5B. Hereafter, such matrix will be called small matrix in order to distinguish from a dot-arrangement matrix that is explained later. For the upper left pixel in small matrix 0, for example, multi-value data is converted to binary data according to pattern 0 of the set dot-arrangement table. In this way, the matrix table of this embodiment stores arrangement information for the patterns 0 to 3.

This kind of small matrix can be prepared in many ways by changing the patterns 0 to 3 that correspond to each of the 4×4 pixels, such as in the case of small matrix 0 to small matrix 3. In this embodiment, the matrix table has m+1 number of small matrices (matrix 0 to matrix m).

FIG. 8 is a drawing illustrating the stored state of a matrix table 111 in the dot-arrangement pattern memory 109. The pattern number of each pixel of each small matrix is correlated with the small matrix, and stored in a specified address.

Figure 9A:
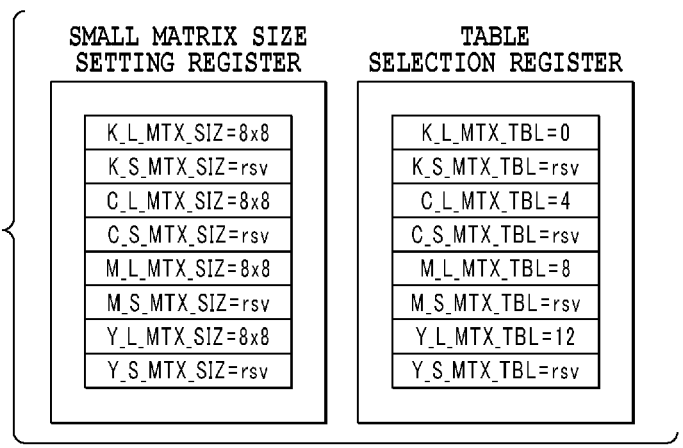
FIGS. 9A to 9C are drawings illustrating the stored state of setting values in a matrix size setting register and starting matrix setting register.
Figure 9B:
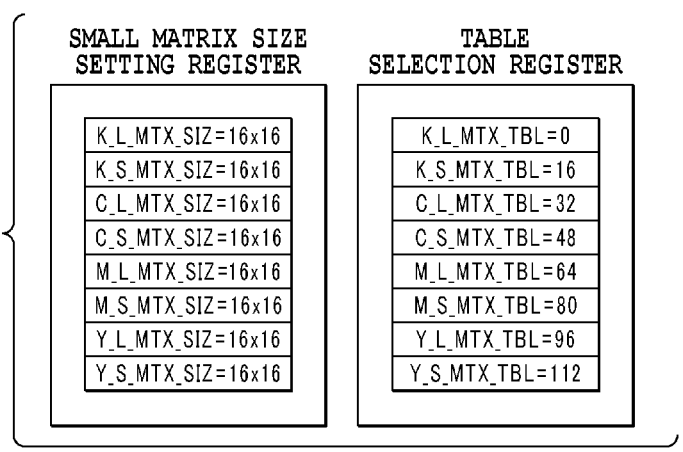
Figure 9C:
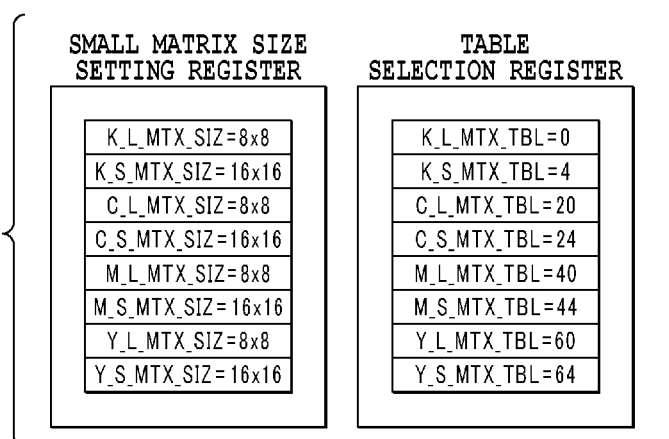

FIGS. 9A to 9C are drawings that illustrate in detail the stored state of setting values in a matrix size setting register 105 and starting matrix setting register 106. In this embodiment, the matrix size setting register 105 and the starting matrix setting register 106 can be set for each of the eight nozzle arrays of the printing head 3, and maintain an area that corresponds to each nozzle array. In the figures, "K_L_MTX_SIZ" indicates the matrix size (N×M) of the black large dot nozzle array. Here, N indicates the number of pixels of small matrix in the main scanning direction (X direction), and M indicates the number of pixels in the sub scanning direction (Y direction). Moreover, "Y_S_MTX_TBL" indicates the reading starting address for the yellow small dot nozzle array.

FIG. 9A illustrates the setting contents of the matrix size setting register 105 and starting matrix setting register 106 in the standard mode of this embodiment. In the standard mode, only the large dot nozzle arrays are used, and 600 ppi, 2-bit 5-value data is converted to the 1200 dpi, 1-bit binary data. In taking a look at the black large dot nozzle array, the matrix size that is set in the matrix size setting register 105 is 8×8, and the reading starting address that is set by the starting matrix setting register 106 is "0". In a case such as this, the matrix generation circuit 108 references the matrix table that is explained using FIG. 8, and acquires a portion 8×8 pixels, or in other words, four continuous small matrices (matrix 0 to matrix 3) starting from address "0" in the table. Then, arranging these, generates a dot-arrangement matrix for the standard mode.

FIGS. 10A to 10D are schematic drawings illustrating an example of dot-arrangement matrices that are created by the matrix generation circuit 108. In the case of the black large dot nozzle array in the standard mode described above, a dot-arrangement matrix such as in FIG. 10A is generated from four continuous small matrices (matrix 0 to matrix 3) starting from the starting address (0X1000). In FIG. 9A, the reading starting addresses for the cyan, magenta and yellow large dot nozzles are different, and are 4 (0X1004), 8 (0X1008) and 12 (0X100C). Therefore, the contents of the dot-arrangement matrices that are generated for each of the large dot nozzle arrays are also shifted with respect to each other.

Figure 10A:
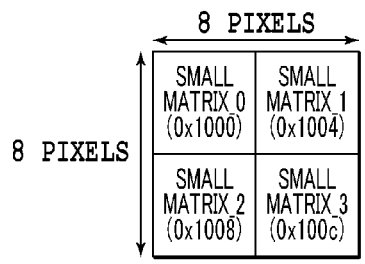
FIGS. 10A to 10D are schematic drawings illustrating examples of dot-arrangement matrices.
Figure 10B:
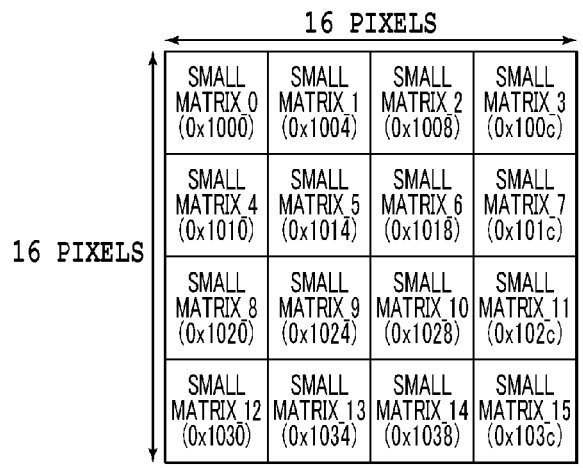
Figure 10C:
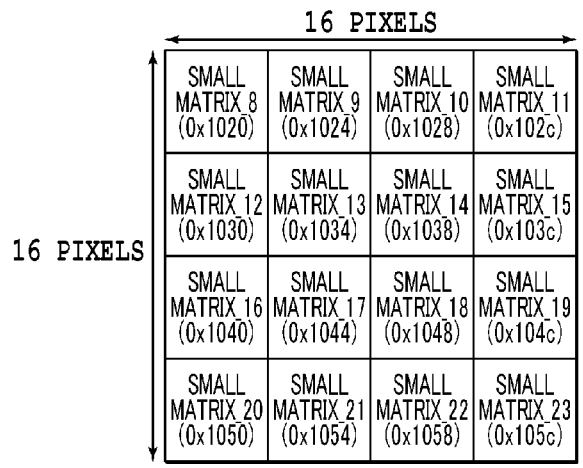

On the other hand, FIG. 9B illustrates the setting contents of the matrix size setting register 105 and starting matrix setting register 106 in the high-quality mode of this embodiment. In the high-quality mode, both large dot nozzle arrays and small dot nozzle arrays are used, and 600 ppi, 2-bit 5-value data is converted to 600 dpi, 1-bit binary data. In looking at the black large dot nozzle array, the matrix size that was set in the matrix size setting register 105 is 16×16, and the reading starting address that is set in the starting matrix setting register 106 is "0". In a case such as this, the matrix generation circuit 108 references the matrix table that was explained in FIG. 8, and reads the portion of 16×16 pixels, or in other words sixteen continuous small matrices (matrix 0 to matrix 15) from the address "0" (0X1000) of the table. Then, by arranging these in order, dot-arrangement matrices for the high-quality mode such as illustrated in FIG. 10B are generated. When doing this, referencing FIG. 9B, the reading starting address for the cyan large dot nozzle array, for example, is "32" (0X1020). Therefore, the matrix generation circuit 108 reads the 16×16 pixel portion, or in other words, sixteen continuous small matrices (matrix 8 to matrix 23) starting from the address "32" (0X1020), and generates dot-arrangement matrices as illustrated in FIG. 10C.

FIG. 9C illustrates an example of making the matrix sizes for the large dot nozzle arrays and small dot nozzle arrays different. While the matrix size used for the large dot nozzle arrays is taken to be 8×8, the matrix size for the small dot nozzle arrays is taken to be 16×16. With this embodiment, by making the matrix sizes for each nozzle array different in this way even in the same printing mode, it is possible to prepare dot-arrangement matrices having a size that is suitable for the dot size and ink color.

Figure 10D:
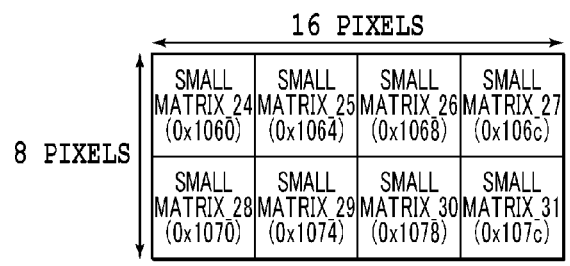

On the other hand, FIG. 10D illustrates an example of dot-arrangement matrices that are generated when the matrix size is 16×8. With this embodiment, it is possible to prepare a dot-arrangement matrix having a different number of pixels in the vertical and horizontal directions (X direction and Y direction).

In FIGS. 9A to 9C, the settings for the reading starting address and the matrix size are performed for each nozzle array. However, it is also possible to set the large dot nozzle arrays and small dot nozzle arrays to the same setting for the same ink color, or to set each of the group of large dot nozzle arrays for the four colors and the group of small dot nozzle arrays for the four colors to the same setting. Moreover, by using a register configuration in which it is possible to set the reading starting address and matrix size for each level of multi-value data, it is also possible to prepare different dot-arrangement matrices for each level.

Incidentally, dot-arrangement matrices such as illustrated in FIGS. 10A to 10D are generally arranged in parallel and repeatedly used on a printing medium; however, arrangement does not necessarily need to be in this form.

Figure 11A:
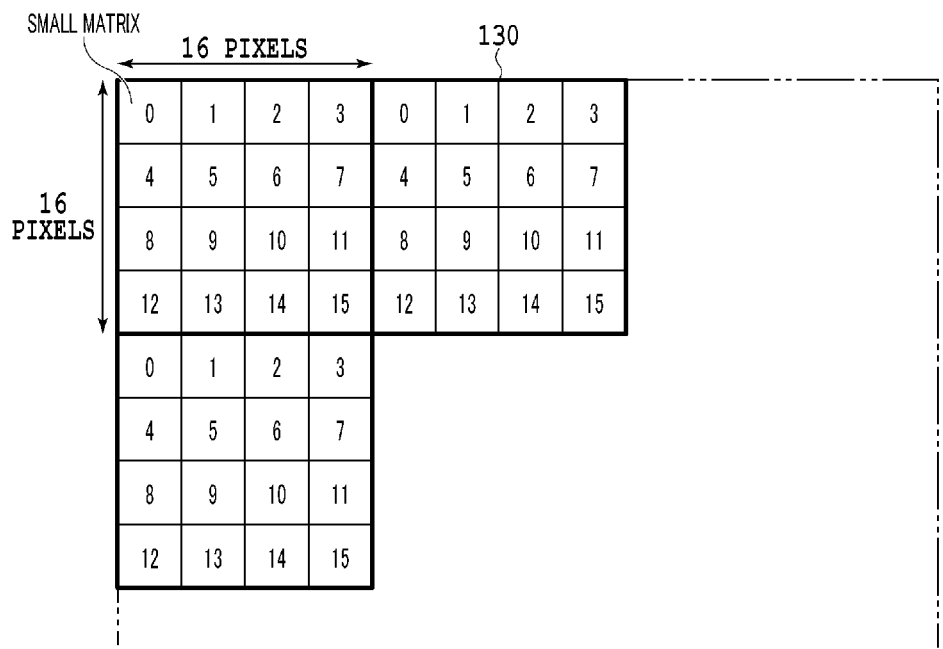
FIGS. 11A and 11B are drawings illustrating examples of the arrangement of dot-arrangement matrices.
Figure 11B:
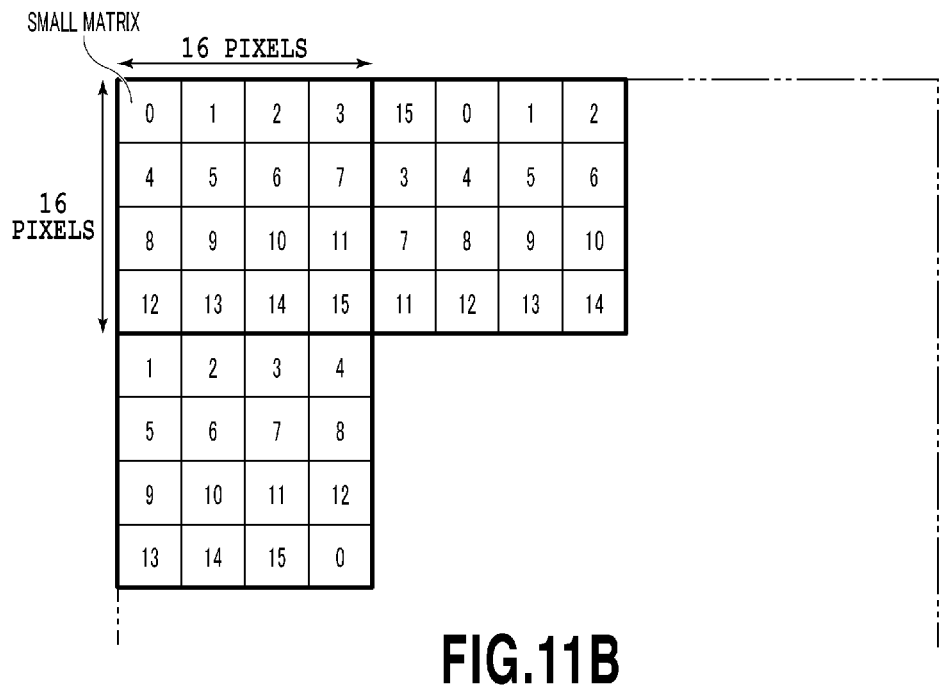

FIGS. 11A and 11B are drawings that illustrate examples of the arrangement on a printing medium of dot-arrangement matrices that were generated by the matrix generation circuit 108. FIG. 11A is a drawing illustrating an example in which generated 16×16 dot-arrangement matrices 130 are repeatedly arranged in the X direction and Y direction. On the other hand, FIG. 11B illustrates a form in which the matrices that are included in the generated 16×16 dot-arrangement matrix 13 are arranged by shifting and rotating. In either case, one dot-arrangement matrix 130 is taken to be a reference, and in the case of FIG. 11B, the period of repeating matrices is further increased without increasing extra memory.

Moreover, above, a form is used in which a plurality of dot-arrangement tables 110 and a plurality of matrix tables 111 are stored in advance in the dot-arrangement pattern memory 109, however, it is also possible to obtain a similar effect by using a register configuration instead of a memory.

Figure 12:
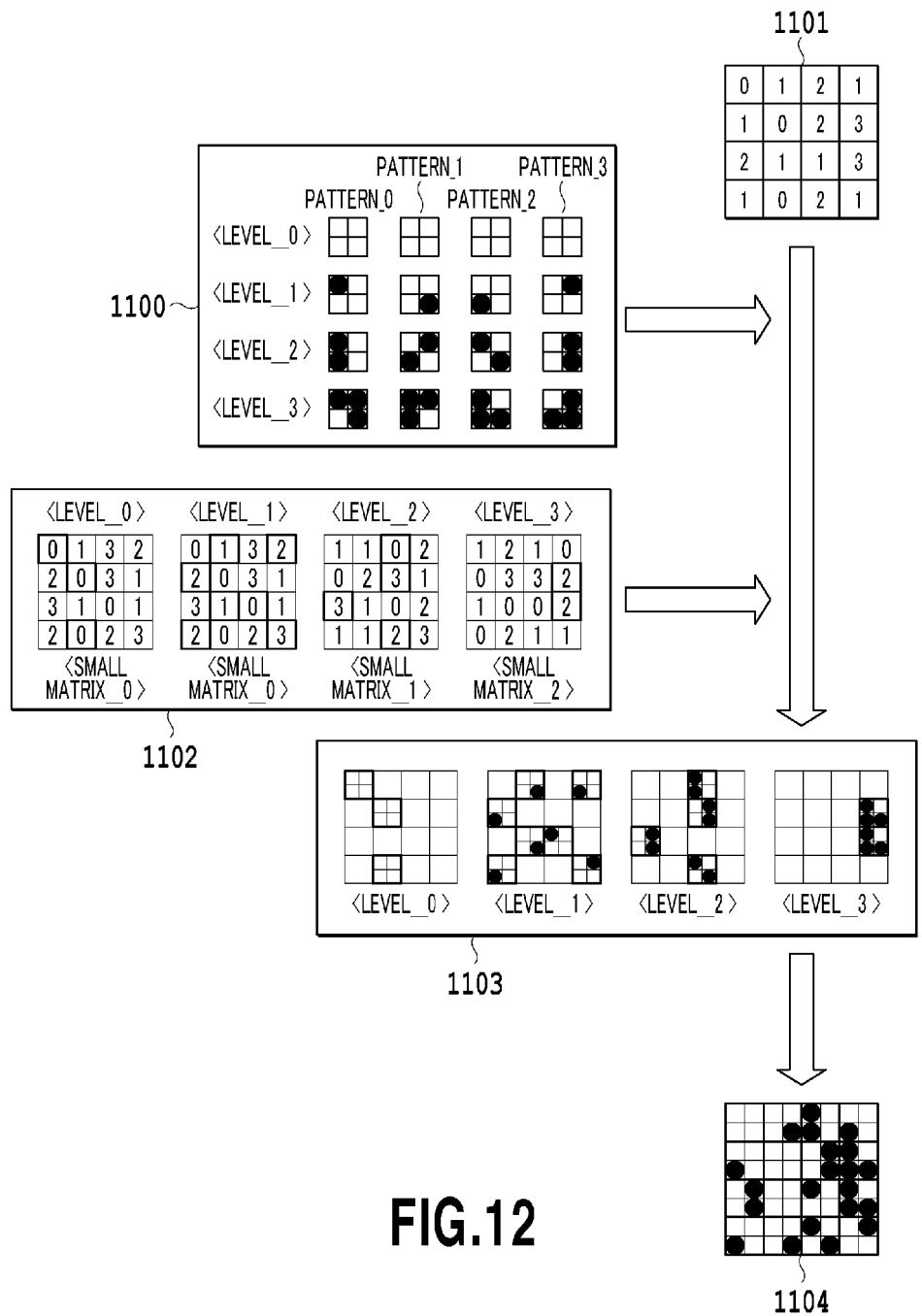
FIG. 12 is a drawing for explaining the process of converting the data that is stored in a print buffer.

FIG. 12 is a drawing for explaining in detail the process by the explained construction wherein the 600 ppi 5-value data that is stored in the print buffer is converted to 1200×1200 dpi binary data. In an arbitrary 4×4 pixel area that is read from the print buffer, the numbers that are given to each individual pixel indicate the level value (level 0 to level 4) of each pixel.

The dot-arrangement table 1100 is read by the binary data generation circuit 112 according to selection by the dot-arrangement table selection register 104.

The small matrix group 1102 indicates the matrix portions of the dot-arrangement matrix generated by the matrix generation circuit 108 that corresponds to the area 1101. In this embodiment, the case is illustrated in which a different dot-arrangement matrix is generated for each of the level 1 to 3. Here, small matrix 0 is set for level 1, small matrix 1 is set for level 2, and small matrix 2 is set for level 3. There is no difference in the dot arrangement no matter what pattern is set for level 0 and level 4, so that they are omitted here.

The binary data generation circuit 112, for each pixel that is included in the area 1101, selects a 2×2 dot pattern from the dot-arrangement table 1100 according to the small matrix that corresponds to the level, and expands that pattern. For example, looking at the upper right pixel in area 1101, the level number of that pixel is "1", and of the small matrix group 1102, small matrix 0 that corresponds to level 1 is allocated. In small matrix 0, the upper right pattern number is "2", so pattern 2 in level 1 of the dot-arrangement table 1100, or in other words, the pattern with one dot in the lower left pixel of the 2×2 area is selected. Then, the pattern that is selected in this way is expanded in the upper right pixel area of area 1101. Through a process such as this, dot patterns 1103 for each pixel are expanded for each level, and by combining these, a final dot pattern 1104 is obtained.

Figure 13:
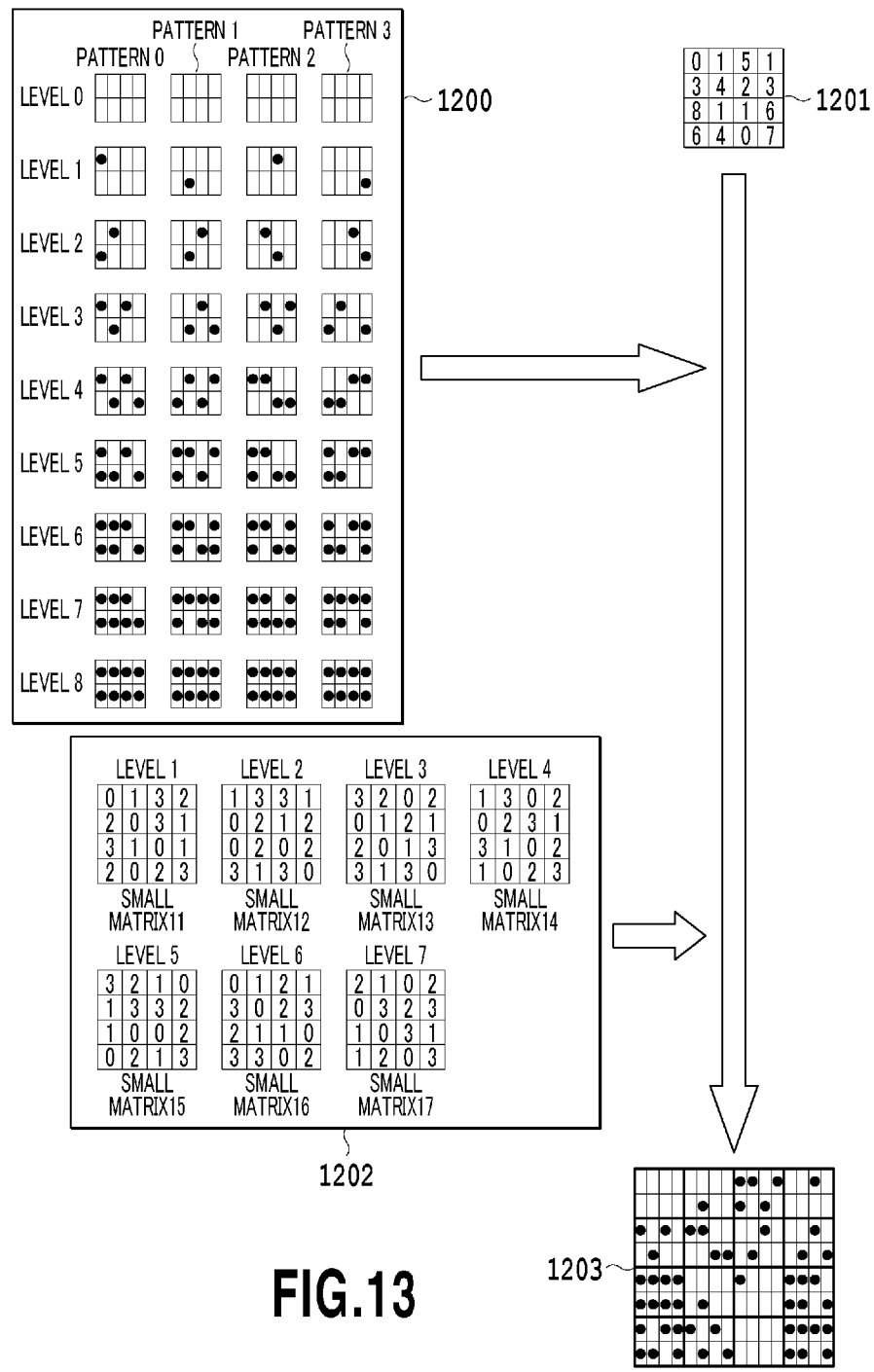
FIG. 13 is a drawing for explaining the process of converting the data that is stored in a printing buffer.

On the other hand, FIG. 13 is a drawing for explaining in detail the process by which 600 ppi 9-value data that is stored in the print buffer is converted to 2400×1200 dpi binary data. In an arbitrary 4×4 pixel area 1201 that is read from the print buffer, the numbers given to each of the individual pixels indicate the level value (level 0 to level 8) of each pixel.

The dot-arrangement table 1200 is read by the binary data generation circuit 112 according to selection by the dot-arrangement table selection register 104.

Small matrix group 1202 indicates the matrix portion of the dot-arrangement matrix that was generated by the matrix generation circuit 108 that corresponds to the area 1201. In this example, the case is illustrated in which a different dot-arrangement matrix is generated for each level 1 to 7. Here, small matrix 11 is set for level 1, small matrix 12 is set for level 2, . . . , and small matrix 17 is set for level 7. There is no difference in the dot arrangement no matter what pattern is set for level 0 and level 8, so that they are omitted here.

As in the case illustrated in FIG. 12, the binary data generation circuit 112, for each pixel that is included in the area 1201, selects a 4×2 dot pattern from the dot-arrangement table 1200 according to the small matrix that corresponds to the level, and expands that pattern. As a result, a final dot pattern 1203 is obtained.

As explained above, with this embodiment, by making it possible to set the size of the matrix table and the reading starting address for each printing mode and nozzle array, it becomes possible to set a dot-arrangement pattern that is suitable for each printing mode and nozzle array. Therefore, it is possible to stably output an image with suppressed image defects due to periodic arrangement of the dot-arrangement pattern without having to prepare a large memory area for dot-arrangement tables or matrix tables for each printing mode and nozzle array.

In the embodiment explained above, an example was explained in which 600 ppi multi-value data is converted to 1200 dpi or 2400×1200 dpi binary data; however, of course the present invention is not limited to this kind of resolution. In the case of converting multi-value data having a lower resolution to high-resolution binary data, it becomes necessary to convert one pixel portion of multi-value data to binary data for a plurality of pixels, and thus the present invention that uses an N×M pixel dot pattern can be effectively used.

Moreover, above, an example was explained of a printer that uses a plurality of nozzle arrays in which a plurality of nozzles are arranged; however, the present invention is not limited to such a form. For example, even in a case such as a monochrome printer in which only one nozzle array is used, it is possible to achieve the effect of the present invention by changing the printing resolution or changing the dot-arrangement matrix that is generated.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-197369, filed Sep. 7, 2012, which is hereby incorporated by reference herein in its entirety.

What is claimed is:

1. An image processing apparatus comprising:
a storing unit configured to store a plurality of small matrices, each of which correlates each pixel included in a predetermined area of a printing medium with a dot-arrangement pattern specifying a dot arrangement to be printed in an area corresponding to a pixel according to a gradation level of the pixel, wherein a plurality of the dot-arrangement patterns are prepared for each gradation level and correlation relationships between each pixel and the dot-arrangement pattern are different among the plurality of the small matrices;
a generation unit configured to determine a size for arranging a small matrix and a combination of the small matrices among the plurality of the small matrices for arranging in the size and generate a dot-arrangement matrix of the size by arranging the determined small matrices; and
a setting unit configured to set a dot arrangement to be printed in an area of the printing medium corresponding to the size according to the dot-arrangement matrix generated by the generation unit.

2. The image processing apparatus according to claim 1, wherein
the storing unit further stores a small matrix arrangement table comprising the small matrices, and
the generation unit determines a reading starting address of the small matrix arrangement table, acquires information of the plurality of the small matrices of the small matrix arrangement table for a number of pieces corresponding to the determined size, and generates the dot-arrangement matrix.

3. The image processing apparatus according to claim 2, wherein
the generation unit correlates the information of the plurality of the small matrices that were acquired from the small matrix arrangement table with a main scanning direction and sub scanning direction on the printing medium, and generates the dot-arrangement matrix by arranging the information in an N×M matrix.

4. The image processing apparatus according to claim 1, wherein
the image processing apparatus is an apparatus for printing an image on the printing medium by using a plurality of nozzle arrays having a plurality of nozzles that discharge ink; and
the generation unit determines the size for each of the plurality of nozzle arrays for each printing operation.

5. The image processing apparatus according to claim 2, wherein
the image processing apparatus is an apparatus for printing an image on the printing medium by using a plurality of nozzle arrays having a plurality of nozzles that discharge ink; and
the generation unit determines the reading starting address for each of the plurality of nozzle arrays for each printing operation.

6. The image processing apparatus according to claim 1, wherein
the generation unit determines the size according to gradation level that is indicated by multi-value data.

7. The image processing apparatus according to claim 2, wherein
the generation unit determines the reading starting address according to a for each gradation level that is indicated by multi-value data.

8. The image processing apparatus according to claim 1, wherein
the generation unit determines the size according to a printing mode when printing an image on the printing medium.

9. The image processing apparatus according to claim 2, wherein
the generation unit determines the reading starting address according to a printing mode when printing an image on the printing medium.

10. The image processing apparatus according to claim 8, wherein
the printing mode is set according to image quality when printing the image.

11. An image processing method executed by an image processing apparatus, the method comprising:
a processor of the image processing apparatus executing:
a storing step of storing a plurality of small matrices, each of which correlates each pixel included in a predetermined area of a printing medium with a dot-arrangement pattern specifying a dot arrangement to be printed in an area corresponding to a pixel according to a gradation level of the pixel, wherein a plurality of the dot-arrangement patterns are prepared for each gradation level and correlation relationships between each pixel and the dot-arrangement pattern are different among the plurality of the small matrices;
a generation step of determining a size for arranging a small matrix and a combination of the small matrices among the plurality of the small matrices for arranging in the size, and generating a dot-arrangement matrix of the size by arranging the determined small matrices; and
a setting step of setting dot arrangement to be printed in an area of the printing medium corresponding to the size according to the dot-arrangement matrix generated by the generation step.

12. The image processing method according to claim 11, wherein
the storing step further stores a small matrix arrangement table comprising the small matrices, and
the generation step determines a reading starting address of the small matrix arrangement table, acquires information of the plurality of the small matrices of the small matrix arrangement table for a number of pieces corresponding to the determined size, and generates the dot-arrangement matrix.

13. The image processing method according to claim 12, wherein
the generation step correlates the information of the plurality of the small matrices that were acquired from the small matrix arrangement table with a main scanning direction and sub scanning direction on the printing medium, and generates the dot-arrangement matrix by arranging the information in an N×M matrix.

14. The image processing method according to claim 11, wherein
the image processing apparatus is an apparatus for printing an image on the printing medium by using a plurality of nozzle arrays having a plurality of nozzles that discharge ink; and
the generation step determines the size for each of the plurality of nozzle arrays for each printing operation.

15. The image processing method according to claim 11, wherein the generation step determines the size according to a printing mode when printing an image on the printing medium.

16. The image processing method according to claim 12, wherein
the generation step determines the reading starting address according to a printing mode when printing an image on the printing medium.

17. The image processing method according to claim 15, wherein
the printing mode is set according to image quality when printing the image.

18. The image processing apparatus according to claim 4, wherein the generation unit determines the size such that sizes that are determined for each of the plurality of nozzle arrays are different from each other.

19. The image processing apparatus according to claim 5, wherein the generation unit determines the reading starting address such that reading starting addresses that are determined for each of the plurality of nozzle arrays are different from each other.

20. The image processing apparatus according to claim 18, wherein ink colors corresponding to the plurality of nozzle arrays respectively are different from each other.

21. The image processing apparatus according to claim 19, wherein ink colors corresponding to the plurality of nozzle arrays respectively are different from each other.

22. The image processing method according to claim 14, wherein the generation step determines the size such that sizes that are determined for each of the plurality of nozzle arrays are different from each other.

23. The image processing method according to claim 22, wherein ink colors corresponding to the plurality of nozzle arrays respectively are different from each other.

24. The image processing apparatus according to claim 1, further comprising a printing unit configured to print ink dots on the printing medium according to the dot arrangement set by the setting unit.

25. A non-transitory computer readable storage medium storing computer executable code of a program for causing a computer to perform the image processing method according to claim 11.

* * * * *